(12) United States Patent
Janarthanam et al.

(10) Patent No.: US 9,067,486 B2
(45) Date of Patent: Jun. 30, 2015

(54) AIR COOLING SYSTEM FOR HIGH VOLTAGE BATTERY CELL ARRAYS

(71) Applicant: Ford Global Technologies, LLC, Dearborn, MI (US)

(72) Inventors: Suriyaprakash Ayyangar Janarthanam, Westland, MI (US); Saravanan Paramasivam, South Lyon, MI (US); Patrick Daniel Maguire, Ann Arbor, MI (US); James George Gebbie, Rochester Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 105 days.

(21) Appl. No.: 14/015,273

(22) Filed: Aug. 30, 2013

(65) Prior Publication Data

US 2015/0060169 A1 Mar. 5, 2015

(51) Int. Cl.
| | | |
|---|---|---|
| *B60R 16/04* | (2006.01) | |
| *B60K 1/04* | (2006.01) | |
| *B60H 1/00* | (2006.01) | |
| *B60K 11/06* | (2006.01) | |
| *H01M 10/625* | (2014.01) | |
| *B60K 1/00* | (2006.01) | |

(52) U.S. Cl.
CPC .............. *B60K 1/04* (2013.01); *B60H 1/00278* (2013.01); *B60K 11/06* (2013.01); *B60K 2001/005* (2013.01); *H01M 10/5016* (2013.01)

(58) Field of Classification Search
CPC ............ B60L 11/1874; B60L 11/1877; B60L 11/1879; B60K 2001/005; B60K 2001/0405; B60K 2001/0416; B60K 2001/0433; H01M 2/1077; H01M 10/5016; H01M 10/5073

USPC .............. 180/65.1, 65.22, 68.1, 68.5; 165/41; 361/690

See application file for complete search history.

(56) References Cited

U.S. PATENT DOCUMENTS

| | | | | |
|---|---|---|---|---|
| 5,558,949 | A * | 9/1996 | Iwatsuki et al. ................ | 429/99 |
| 5,589,290 | A * | 12/1996 | Klink et al. ..................... | 429/99 |
| 6,085,854 | A * | 7/2000 | Nishikawa .................... | 180/68.5 |
| 6,188,574 | B1 * | 2/2001 | Anazawa ....................... | 361/695 |
| 6,315,069 | B1 * | 11/2001 | Suba et al. .................... | 180/68.5 |
| 6,335,116 | B1 * | 1/2002 | Yamane et al. ............... | 429/176 |
| 6,445,582 | B1 * | 9/2002 | Oda et al. ...................... | 361/695 |
| 6,662,891 | B2 * | 12/2003 | Misu et al. .................... | 180/68.1 |
| 7,230,404 | B2 * | 6/2007 | Kimoto et al. ................ | 320/150 |
| 7,399,551 | B2 * | 7/2008 | Yagi et al. ..................... | 429/148 |

(Continued)

FOREIGN PATENT DOCUMENTS

| | | |
|---|---|---|
| EP | 1031451 A2 | 8/2000 |
| EP | 2226212 B1 | 9/2011 |

*Primary Examiner* — Brodie Follman
(74) *Attorney, Agent, or Firm* — David B. Kelley; Brooks Kushman P.C.

(57) ABSTRACT

A vehicle is provided including a battery module with front and rear battery cell arrays arranged generally parallel to and spaced apart from one another. The battery module includes a cover having an inlet port proximate to the front battery cell array and arranged obliquely thereto. A blower unit is configured to draw air through the inlet port such that a first portion of the air travels into the front battery cell array. A tray cooperates with the front battery cell array to define a passageway configured to direct a second portion of the air underneath the front battery cell array. The tray also defines a ramp underneath, and extending substantially a length of, the rear battery cell array and is configured to direct the second portion of air into the rear array.

14 Claims, 6 Drawing Sheets

(56) References Cited

U.S. PATENT DOCUMENTS

| | | | |
|---|---|---|---|
| 7,618,740 B2* | 11/2009 | Hamada et al. | 429/120 |
| 7,654,351 B2* | 2/2010 | Koike et al. | 180/68.5 |
| 7,688,582 B2* | 3/2010 | Fukazu et al. | 361/690 |
| 7,823,672 B2* | 11/2010 | Watanabe et al. | 180/68.5 |
| 7,905,307 B2* | 3/2011 | Kubota et al. | 180/68.1 |
| 7,997,966 B2* | 8/2011 | Yoda | 454/339 |
| 8,187,736 B2 | 5/2012 | Park et al. | |
| 8,241,097 B2 | 8/2012 | Zhu et al. | |
| 8,276,696 B2 | 10/2012 | Lucas | |
| 8,329,330 B2* | 12/2012 | Okada | 429/120 |
| 8,440,339 B2* | 5/2013 | Harada et al. | 429/83 |
| 8,507,122 B2* | 8/2013 | Saito et al. | 429/120 |
| 8,556,017 B2 | 10/2013 | Kubota et al. | |
| 8,658,303 B2* | 2/2014 | Chung et al. | 429/120 |
| 8,722,223 B2* | 5/2014 | Yang et al. | 429/72 |
| 8,757,249 B2* | 6/2014 | Bandai et al. | 165/202 |
| 8,785,025 B2* | 7/2014 | Sohn | 429/120 |
| 8,794,361 B2 | 8/2014 | Lim et al. | |
| 2005/0153199 A1* | 7/2005 | Yagi et al. | 429/148 |
| 2007/0040418 A1* | 2/2007 | Ohkuma et al. | 297/15 |
| 2007/0072061 A1* | 3/2007 | Shimizu | 429/62 |
| 2007/0087266 A1* | 4/2007 | Bourke et al. | 429/159 |
| 2007/0202792 A1* | 8/2007 | Shimizu et al. | 454/69 |
| 2007/0238015 A1 | 10/2007 | Kubota et al. | |
| 2008/0296075 A1* | 12/2008 | Zhu et al. | 180/68.1 |
| 2009/0183935 A1 | 7/2009 | Tsuchiya | |
| 2009/0220852 A1* | 9/2009 | Fujii | 429/72 |
| 2010/0276220 A1* | 11/2010 | Kubota et al. | 180/68.1 |
| 2011/0076541 A1* | 3/2011 | Meintschel et al. | 429/120 |
| 2011/0206948 A1* | 8/2011 | Asai et al. | 429/7 |
| 2011/0244295 A1* | 10/2011 | Han et al. | 429/120 |
| 2012/0034507 A1* | 2/2012 | Harada et al. | 429/120 |
| 2012/0073797 A1 | 3/2012 | Park et al. | |
| 2012/0312610 A1 | 12/2012 | Kim et al. | |
| 2012/0328928 A1* | 12/2012 | Oh et al. | 429/120 |
| 2013/0149575 A1* | 6/2013 | Gebbie et al. | 429/72 |
| 2013/0183564 A1* | 7/2013 | Wagner | 429/120 |
| 2013/0330587 A1* | 12/2013 | Takahashi et al. | 429/99 |
| 2014/0308551 A1* | 10/2014 | Schroeder et al. | 429/81 |
| 2015/0010782 A1* | 1/2015 | Tanigaki et al. | 429/7 |
| 2015/0060169 A1* | 3/2015 | Janarthanam et al. | 180/68.2 |

* cited by examiner

AIR COOLING SYSTEM FOR HIGH VOLTAGE BATTERY CELL ARRAYS

TECHNICAL FIELD

This disclosure relates to thermal management systems for a high voltage battery utilized in vehicles.

BACKGROUND

Vehicles such as battery-electric vehicles (BEVs), plug-in electric vehicles (PHEVs) or hybrid-electric vehicles (HEVs) contain a traction battery, such as a high voltage ("HV") battery, to act as a propulsion source for the vehicle. The HV battery may include components and systems to assist in managing vehicle performance and operations. The HV battery may include a battery module with one or more arrays of battery cells interconnected electrically between battery cell terminals and interconnector busbars. The HV battery and surrounding environment may include a thermal management system to assist in regulating temperature of the HV battery components, systems and individual battery cells.

SUMMARY

A vehicle includes first and second cell stacks supported on a tray. The first and second cell stacks are arranged generally parallel to and spaced apart from one another. The first cell stack and tray cooperate to define a passageway configured to direct air underneath the first cell stack to the second cell stack. The second cell stack is supported on the tray such that air flowing between the second cell stack and tray is directed into the second cell stack. The vehicle may also include a cover cooperating with the tray to define a container for the cell stacks. The cover may also define an air inlet port adjacent to a face of the first stack and arranged oblique to the cell stacks to direct air away from the face and through the stacks. The first and second cell stacks may be spaced apart from one another such that heated air exiting a lateral side of the first cell stack enters a lateral side of the second cell stack. The second stack may be supported on the tray such that a portion of the air flowing underneath the first cell stack toward the second stack is directed into the lateral side of the second cell stack. The vehicle may also include a duct configured to direct air from a cabin of the vehicle to the air inlet port.

A battery module for a vehicle includes a container having a cover portion and a base portion. The container defines an inlet port. The battery module also includes first and second cell stacks supported on the base portion and housed within the container. The cell stacks define a first passageway therebetween which is configured to direct fluid flow between the stacks. The base portion and first cell stack define a second passageway therebetween which is configured to direct fluid flow underneath the first cell stack. The base portion defines a ramp underneath the second cell stack which is configured to direct the fluid flow from the second passageway into the second cell stack. The inlet port may be adjacent to a face of the first cell stack and arranged oblique to the cell stacks to direct air away from the face and through the cell stacks. The first passageway may have a width such that heated air exiting a lateral side of the first cell stack enters a lateral side of the second cell stack. The ramp may be configured to direct fluid flow from the second passageway into the lateral side of the second cell stack. A duct may be configured to direct air from a cabin of the vehicle to the inlet port.

A battery module for a vehicle includes front and rear battery cell arrays arranged generally parallel to and spaced apart from one another. The battery module also includes a cover, a blower unit and a tray. The cover has first and second inlet ports proximate to the front battery cell array and arranged obliquely thereto. The blower unit is configured to draw air through the first and second inlet ports such that a first portion of the air travels into the front battery cell array. The tray cooperates with the front battery cell array to define a passageway configured to direct a second portion of the air underneath the front battery cell array. The tray also defines a ramp underneath, and extending substantially a length of, the rear battery cell array and is configured to direct the second portion of air into the rear array. The front and rear battery cell arrays may be spaced apart to define another passageway configured to direct the first portion of air exiting the front battery cell array, and the second portion of air, into the rear battery cell array. The front and rear battery array cells may be spaced apart from one another such that heated air exiting a lateral side of the front battery cell array enters a lateral side of the rear battery cell array. A first duct and second duct may be configured to direct air from a cabin of the vehicle to the first and second inlet ports when the blower unit is activated.

BRIEF DESCRIPTION OF THE DRAWINGS

FIG. 3b is a plan view of the battery pack and duct systems from FIG. 1 and FIG. 3a.

FIG. 4c is a perspective view, in cross-section, of the jumper duct from FIG. 4a.

FIG. 4d is a side view, in cross-section, of the jumper duct from FIG. 4a.

DETAILED DESCRIPTION

Figure 1:
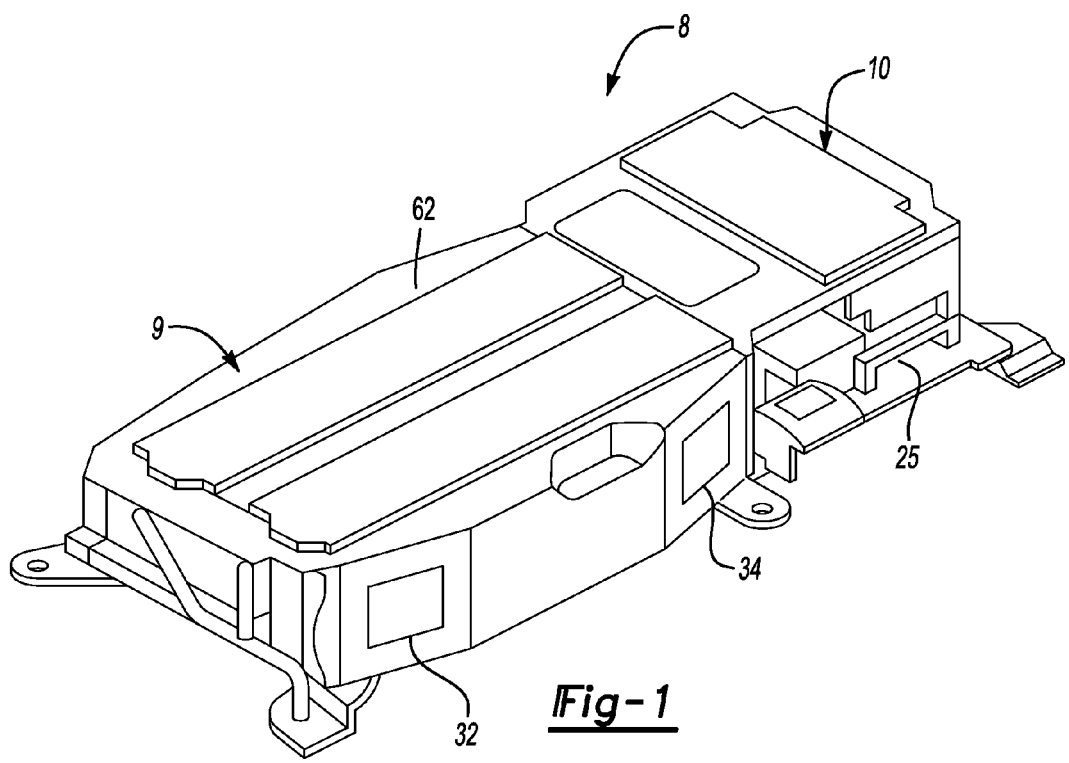
FIG. 1 is a perspective view of a battery pack.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles which utilize an HV battery may include an energy system having a battery pack with components such as one or more battery modules with battery cells, a body electrical control module (BECM), and a DC/DC converter module with a DC/DC converter unit. The battery cells may provide energy to operate a vehicle drive motor and other vehicle systems. The battery pack may be positioned at several different locations including below a front seat, a rear seat, or a location behind the rear seat of the vehicle. Two battery cell arrays may be in electrical communication with the BECM, DC/DC converter unit and other vehicle components. The BECM may receive input signals from various control systems, process information included in the input signals and generate appropriate control signals in response thereto. These control signals may activate and/or deactivate the various components. The DC/DC converter unit may convert high voltage from the battery cells into low voltage for use by the components and systems.

Each battery cell array may include battery cells. The battery cells, such as a prismatic cell, may include electrochemical cells that convert stored chemical energy to electrical energy. Prismatic cells may include a can housing, a positive electrode (cathode) and a negative electrode (anode). An electrolyte may allow ions to move between the anode and cathode during discharge, and then return during recharge. Terminals may allow current to flow out of the cell for use by the vehicle. When positioned in an array with multiple battery cells, the terminals of each battery cell may be aligned with opposing terminals (positive and negative) adjacent to one another to facilitate a series connection between the multiple battery cells.

Busbars may be used to assist in completing the series connection between adjacent battery cells or groups of battery cells proximate to one another. Different battery pack configurations may be available to address individual vehicle variables including packaging constraints and power requirements described further herein. The battery cells may be heated and/or cooled with a thermal management system. Examples of thermal management systems may include air cooling systems, liquid cooling systems and a combination of air and liquid systems.

Air cooling systems may use one or more blowers and ducts to distribute air across, for example, the components of the battery module and DC/DC converter module to remove heat generated during vehicle operations. These operations may include charging and discharging the battery cells as well as removing the heat generated during voltage conversion in the DC/DC converter unit. Vehicle components in the environment surrounding the battery pack may be utilized to assist in managing the battery pack's thermal conditions.

Figure 2:
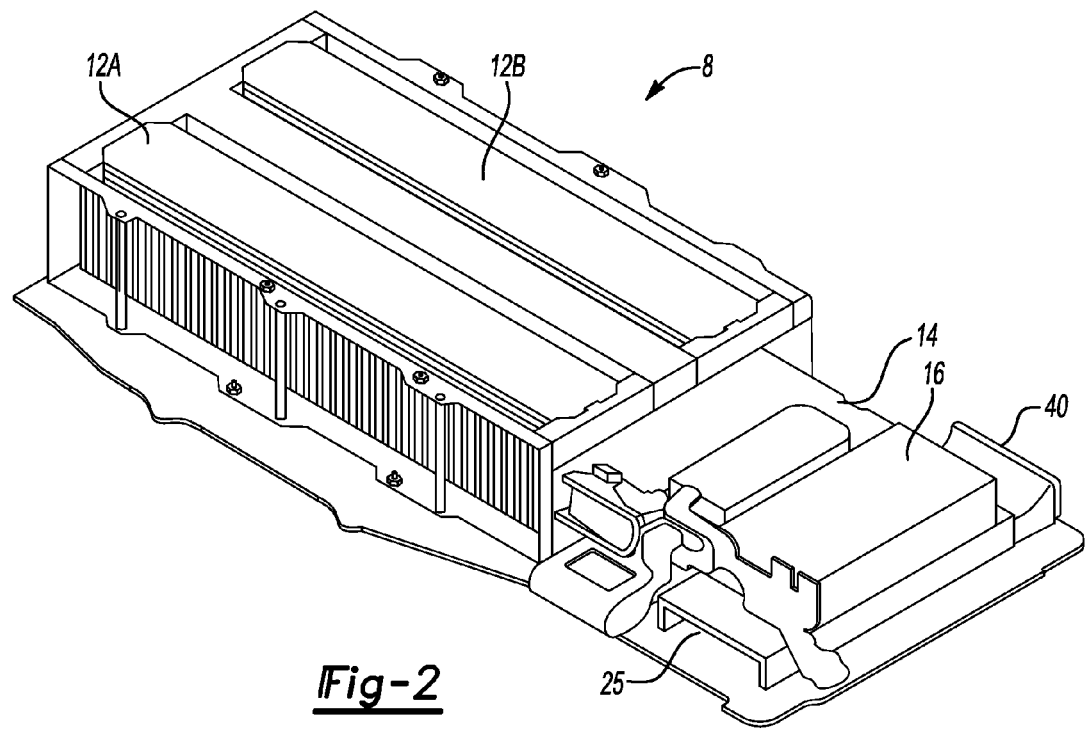
FIG. 2 is a perspective view of the battery pack from FIG. 1 with a battery module cover and DC/DC converter module cover removed.
Figure 3A:
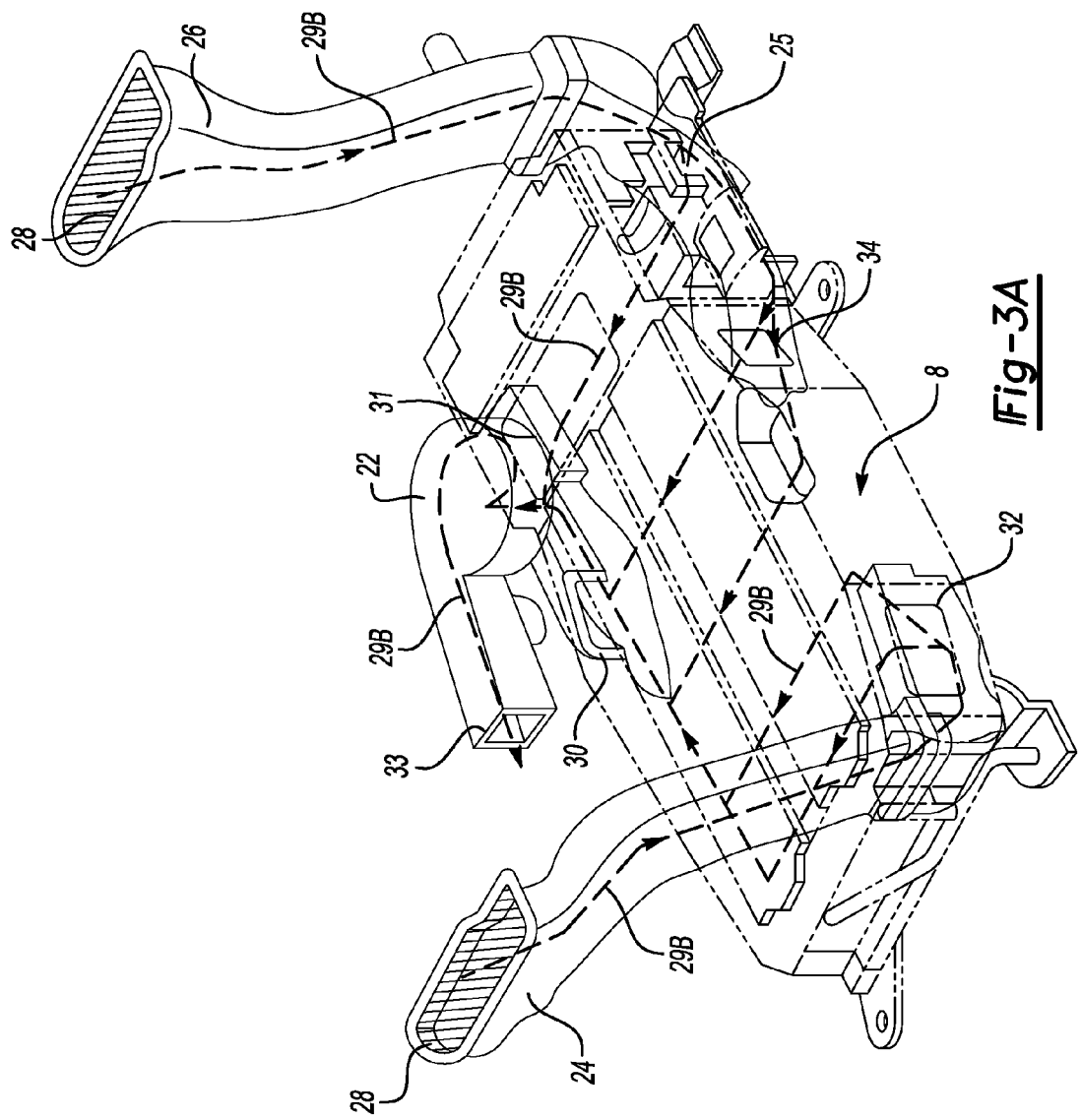
FIG. 3a is a perspective view of duct systems, a blower unit and the battery pack from FIG. 1.

For example and now referring to FIGS. 1 and 2, an illustrative battery pack 8 is shown which may include a battery module 9 and a DC/DC converter module 10. The battery module 9 may also be referred to as a traction battery module. The battery pack 8 may further include two battery cell arrays 12*a* and 12*b* (jointly referred to as "battery cell arrays 12"), a BECM 14, a DC/DC converter unit 16, and an air cooling system. The battery cell arrays 12 may also be referred to as cell stacks or first and second cell stacks. FIG. 3A shows a perspective view of some of the components of the air cooling system arranged with the battery pack 8 (battery pack 8 shown in phantom for illustrative purposes). The air cooling system may include a blower unit 22, a first duct system 24, a second duct system 26, and one or more vents 28. Additional examples of the blower unit 22 may include a fan unit and/or air pump. Battery inlet ports 32 and 34 may open to the first duct system 24 and second duct system 26 to facilitate fluid communication with the battery pack 8.

Figure 3B:
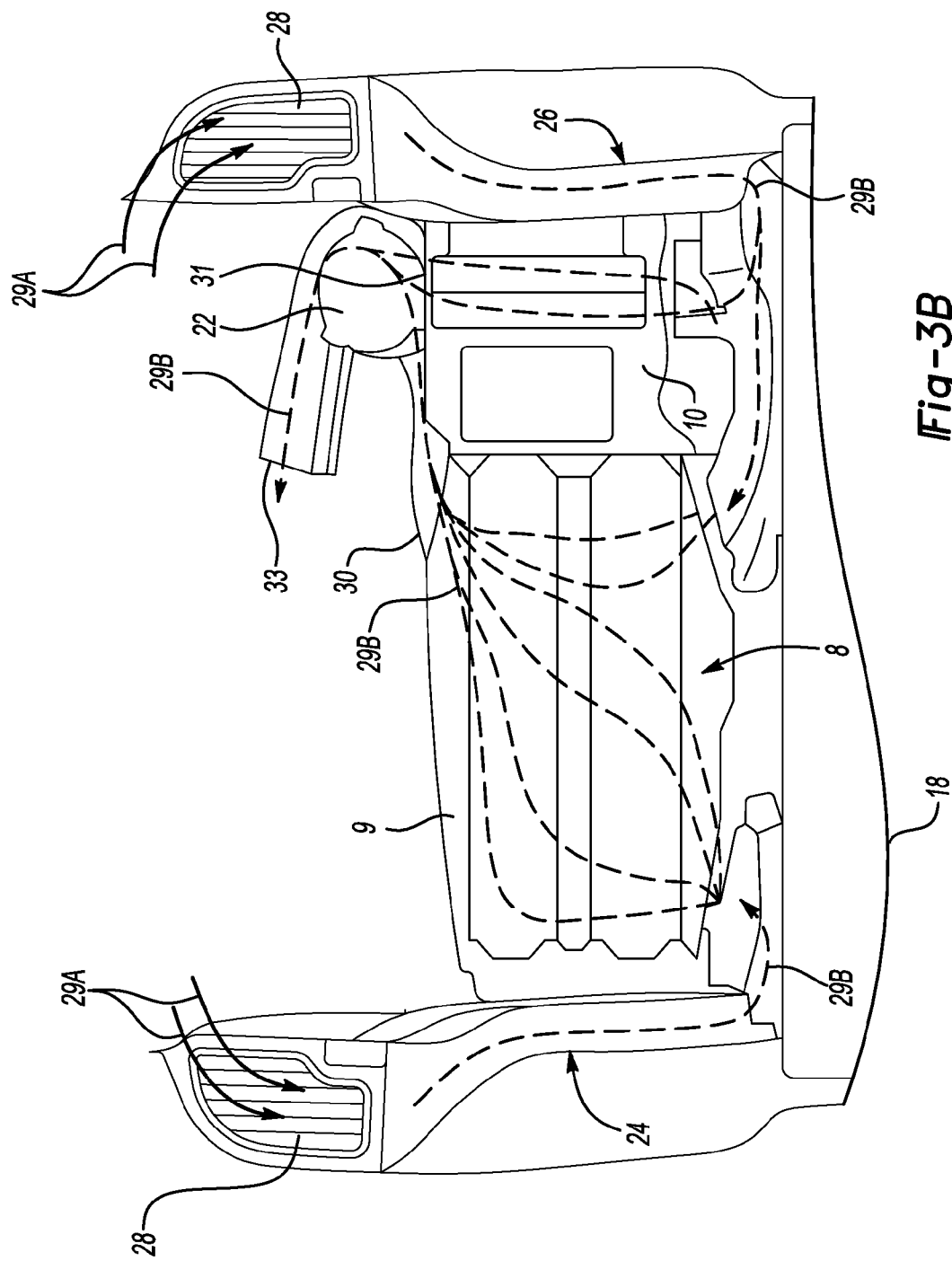
Figure 4A:
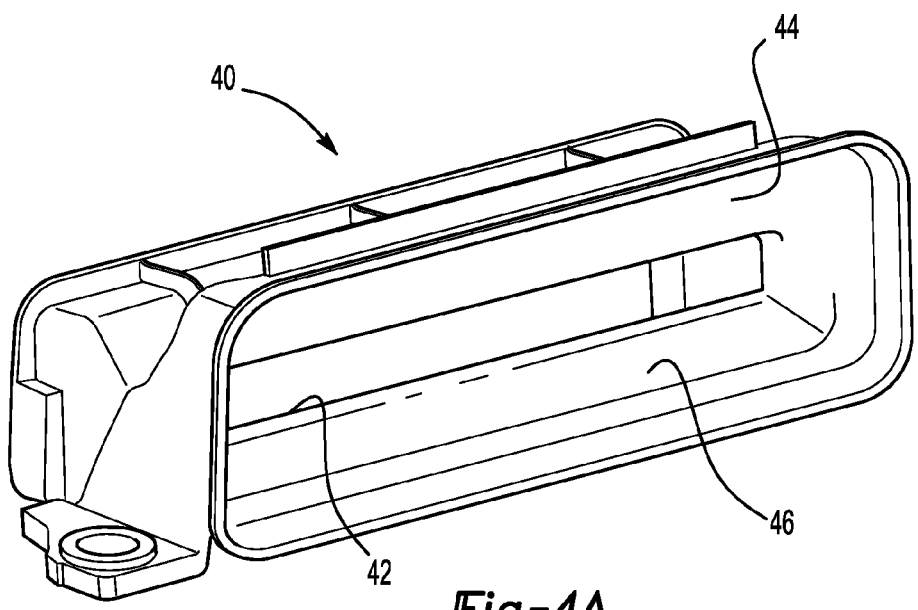
FIG. 4a is a perspective view of a jumper duct.
Figure 4B:
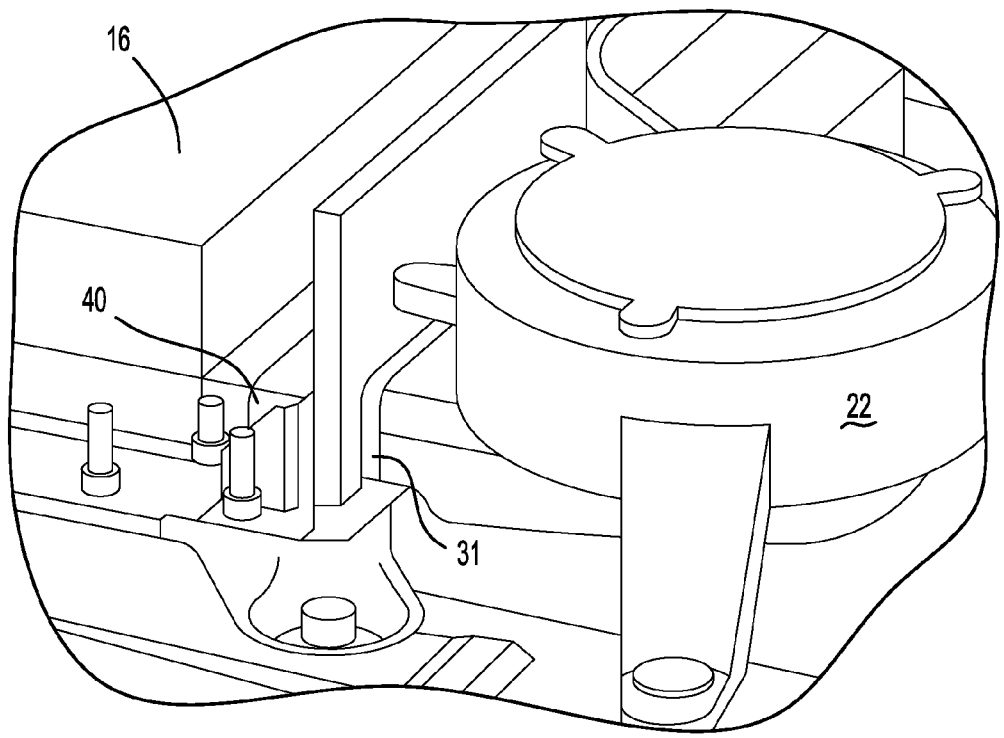
FIG. 4b is a perspective view of a portion of a DC/DC converter unit, the jumper duct from FIG. 4a, and a blower unit.
Figure 4C:
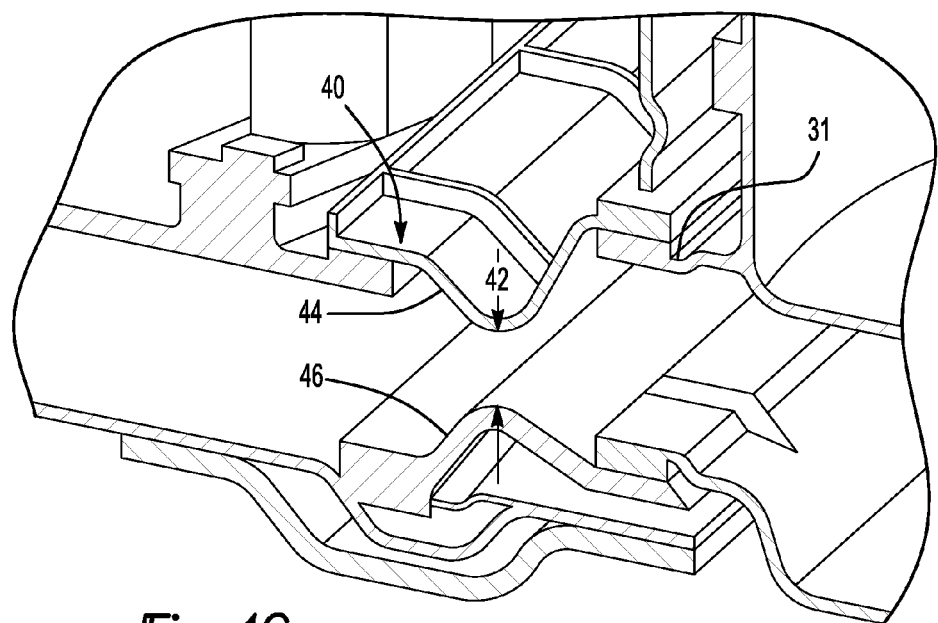
Figure 4D:
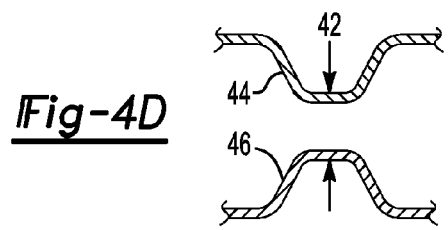

FIG. 3*b* shows the battery pack 8 positioned rearward of a rear seating row 18 and adjacent to a trunk portion which may include a cargo tub described below. Vents 28 may serve as inlet ports to the first duct system 24 and second duct system 26. As such, the vents 28 may assist in facilitating fluid communication between a vehicle cabin climate system, and the first duct system 24 and second duct system 26. The second duct system 26 may also be in fluid communication with the DC/DC converter unit 16 via DC/DC converter inlet port 25. The blower unit 22 may be positioned downstream of the battery cell arrays 12 and DC/DC converter unit 16. Further, the blower unit 22 may be positioned proximate to a battery outlet 30 and DC/DC converter unit outlet 31 such that when the blower unit 22 is activated in a first direction, air is pulled across the battery cell arrays 12, the DC/DC converter unit 16, and out a blower outlet port and/or exhaust port 33. The outlet ports herein may also be referred to as exhaust ports. Due to fluid communication with the blower unit 22, the exhaust port 33 may also operate as an exhaust port for air used to cool the battery pack 8. Solid lines and reference arrows 29*a* show the air flow entering the duct systems from the vehicle cabin via the vents 28. Dashed lines and reference arrows 29*b* show the air flow traveling through the duct systems, across the components of the battery pack 8, through the blower unit 22, and exiting the blower exhaust port 33. The lines and reference arrows herein are non-limiting examples of air flow.

Referring now additionally to FIGS. 4*a* through 4*d*, a jumper duct 40 may be arranged with the DC/DC converter unit outlet 31 and positioned upstream of the blower unit 22. The jumper duct 40 may also be within the DC/DC converter unit outlet 31. Jumper duct 40 may include an opening 42, a first ramp 44 and a second ramp 46. A preferred tuning of a cross-sectional area for the opening 42 and angles associated with the ramps 44 and 46 may influence air flow from the second duct system 36 into the battery inlet port 34 and DC/DC converter inlet port 25. For example, the jumper duct 40 may reduce an effective cross-sectional area of the DC/DC converter unit outlet 31. This reduced effective cross-sectional area may be different than an effective cross-sectional area of the battery inlet port 34 such that air flow rates through each may also be different when the blower unit 22 is activated. Also, a preferred tuning of a cross-sectional area for the opening 42 and angles associated with the ramps 44 and 46 may influence air flow out of the battery outlet 30.

In one exemplary configuration, a flow rate of cooling air into the battery inlet port 34 may be less than a flow rate of cooling air into the DC/DC converter inlet port 25. While various configurations are available, a preferred air flow distribution ratio between the DC/DC converter inlet port 25 and battery inlet port 34 may be equal to 60/40, with sixty percent of the air flow being directed to the DC/DC converter module 10 and forty percent of the air flow being directed to the battery module 9. Additionally, a net flow rate of cooling air into the battery inlet port 34 and battery inlet port 32 may be greater than the flow rate of the cooling air into the DC/DC converter inlet port 25. Other cross-sectional areas for the ports are available to achieve a desired flow rate and flow rate distribution ratio. For example, reducing the cross-sectional area of opening 42 may reduce the portion of air flow directed toward the DC/DC converter unit 16 and increase the portion of air flow directed toward the battery cell arrays 12.

Further, angles of the first ramp 44 and second ramp 46 may also influence the distribution of air from second duct system 36. Increasing and decreasing the degree of the angle for the ramps may decrease and increase, respectively, the air flow directed toward the DC/DC converter unit 16 and the portion of air flow directed toward the battery cell arrays 12. As such, adjusting the configuration of the jumper duct 40 may provide multiple air flow distribution scenarios using the first duct system 24 and the second duct system 26 to distribute cooling air to the battery module 9 and DC/DC converter module 10. This may save cost, weight and package space since two separate cooling systems may not be required for both the battery module 9 and DC/DC converter module 10.

Further, an effective cross-sectional area of the battery inlet port 32, battery inlet port 34, and DC/DC converter inlet port 25 equaling two square inches per N cubic feet per minute of air flow may reduce air inrush noise at the vents 28 where N is a target air flow out of the blower outlet port 33. For example, the target air flow may be equal to 10 cubic feet per minute of air flow. Additionally, using a cross-sectional area of two square inches per ten cubic feet per minute of air flow throughout first duct system 24 and second duct system 26, and an effective cross-sectional area of one square inch per ten cubic feet per minute of air flow at the blower outlet 33 may reduce the pressure drop along the air flow paths and provide an opportunity to operate the blower unit 22 at a lower speed which may reduce vehicle interior noise.

In this exemplary configuration, substantially seventy percent of the total air flow entering first duct system 24 and second duct system 26 may be delivered to the battery module 9. Further, approximately thirty percent of the total air flow entering the first duct system 24 and second duct system 26 may be delivered to the DC/DC converter module 10. Or sixty percent of the total air flow entering the second duct system 26 may be delivered to the DC/DC converter module 10 and forty percent to the battery module 9. Other cross-sectional areas for the inlet ports are available to achieve a desired flow rate and flow rate distribution ratio.

Figure 5:
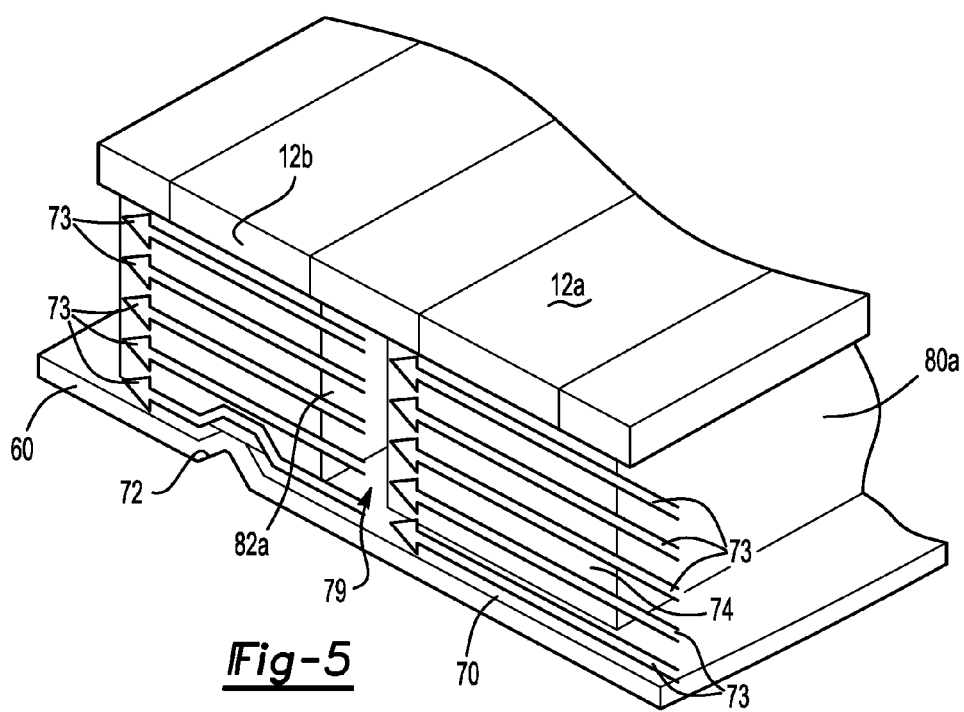
FIG. 5 is a perspective view of a portion of two battery cell arrays showing air flow across the two battery cell arrays.
Figure 6:
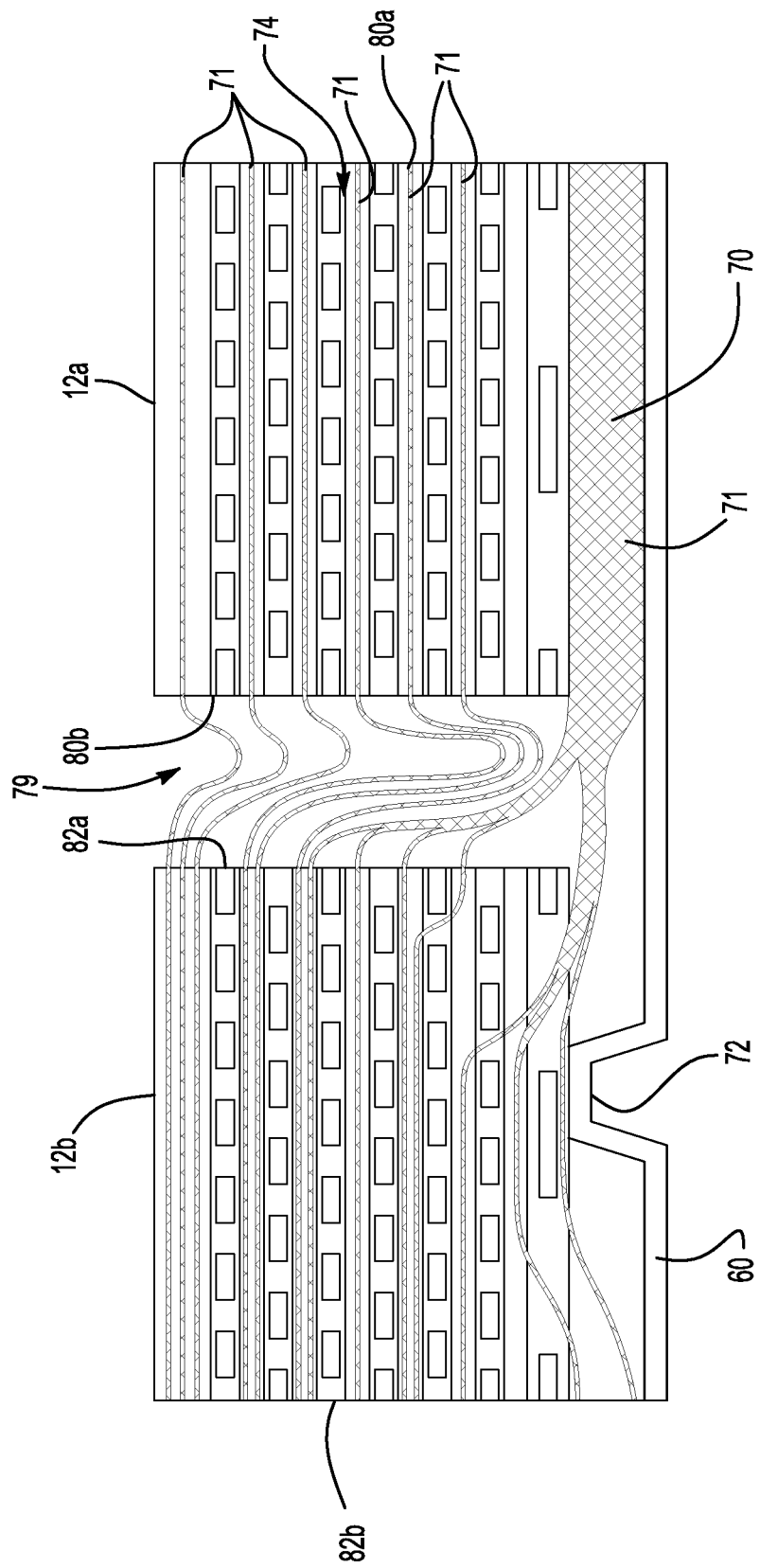
FIG. 6 is a side view, in cross-section, of two battery cell arrays showing air flow across the two battery cell arrays.

As mentioned above, previous battery module designs in the art may have utilized separate cooling systems for separate battery cell arrays and a DC/DC converter unit. Eliminating one of the cooling systems may reduce weight and packaging complexities. Referring now again to FIG. 1 and additionally to FIGS. 5 and 6, a battery module tray 60 and battery module cover 62 may be configured to influence a distribution of air to the battery cell arrays 12. This air may be drawn from the vehicle cabin 27 as described above. Battery module tray 60 and battery module cover 62 may assist in directing air drawn from the cabin to the front array 12a and to the rear array 12b. Air flowing through the front array 12a may increase in heat while cooling the front array 12a. This heated air exiting the front array 12a may then be directed to the rear array 12b. Exemplary patterns of air flow 73 and 71 are illustrated in FIG. 5 and FIG. 6.

For example, front array 12a and rear array 12b may be supported on the battery module tray 60, arranged generally parallel to one another, and spaced apart. The front array 12a and battery module tray 60 may cooperate to define passageways and/or channels, such as passageway 70. Passageway 70 may be configured to direct a portion of the air entering the battery module 9 to flow underneath the front array 12a. The rear array 12b may be supported on battery module tray 60 such that air flowing between the rear array 12b and battery module tray 60 is directed into rear array 12b. For example, battery module tray 60 may include a ramp 72 positioned below rear array 12b and oriented such that air flow contacting the ramp 72 may be directed into the rear array 12b. An angle of the ramp 72 and height of the ramp may be adjusted to further tune the amount of air directed into rear array 12b.

The battery module cover 62 and battery module tray 60 may define a container for the battery cell arrays 12 and also define battery inlet port 32 and battery inlet port 34. These battery inlet ports 32 and 34 may be adjacent to a face 74 of the front array 12a. The battery inlet ports 32 and 34 may also be arranged obliquely and/or at an angle relative to the battery cell arrays 12 to assist in directing the air away from the face 74 which may provide improved air distribution across the battery cell arrays 12 and/or throughout the battery module 9. The angle orientation of battery inlet ports 32 and 34 relative to the battery cell arrays 12 may provide broader air flow distribution across the battery cell arrays 12 when compared with inlet port orientations which may direct air flow substantially perpendicular across the battery cell arrays 12.

Front array 12a may include lateral sides 80a and 80b. Rear array 12b may include lateral sides 82a and 82b. Lateral side 80b and 82a may define a passageway 79 for air flow therebetween. As shown in FIG. 6, there may be a minimal number of components, or an absence of components, between lateral side 80b and lateral side 82a to block air flow therebetween. While a small number of components, such as structural posts, may be present to support the battery cell arrays 12, the substantial lack of components between the front array 12a and rear array 12b may be such that air exiting lateral side 80b may enter lateral side 82a with minimal, if any, disruption. As such, air flow may be delivered to rear array 12b via passageway 70 and ramp 72, and also delivered via passageway 79 after exiting front array 12a. The air flow may include cabin air to the front array 12a, and a combination of cabin air and heated cabin air to rear array 12b.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
    a tray;
    first and second cell stacks cooperating with the tray to define passageways configured to direct air underneath the first stack to the second stack;
    a converter supported by the tray;
    a cover housing the stacks and converter, and defining cell ports and a converter port; and
    a pair of ducts, one of the ducts being in fluid communication with the converter port and one of the cell ports.

2. The vehicle of claim 1, wherein one of the cell ports is adjacent to a face of the first stack and arranged oblique to the stacks to direct air through the stacks.

3. The vehicle of claim 1, wherein the first and second stacks are spaced apart from one another such that heated air exiting a lateral side of the first stack enters a lateral side of the second stack adjacent to the lateral side of the first stack.

4. The vehicle of claim 3, wherein the second stack is supported on the tray such that a portion of the air flowing underneath the first stack toward the second stack is directed into the lateral side of the second stack.

5. The vehicle of claim 1, wherein the ducts are configured to direct air from a cabin of the vehicle into the ports.

6. A battery module for a vehicle comprising:
a container having a cover portion and a base portion, and defining a pair of battery inlet ports and a converter module inlet port;
a first duct in fluid communication with one of the battery inlet ports and a second duct in fluid communication with the other of the battery inlet ports and the module inlet port; and
first and second cell stacks supported on the base portion and housed within the container, the stacks defining a first passageway therebetween configured to direct fluid flow between the stacks, the base portion and first stack defining a second passageway therebetween configured to direct fluid flow underneath the first stack, and the base portion further defining a ramp underneath the second stack and configured to direct the fluid flow from the second passageway into the second stack.

7. The battery module of claim 6, wherein at least one of the battery inlet ports is adjacent to a face of the first stack and arranged oblique to the stacks to direct air away from the face and through the stacks.

8. The battery module of claim 6, wherein the first passageway has a width such that heated air exiting a lateral side of the first stack enters a lateral side of the second stack adjacent to the lateral side of the first stack.

9. The battery module of claim 8, wherein the ramp is further configured to direct fluid flow from the second passageway into the lateral side of the second stack.

10. The battery module of claim 6, wherein the ducts area configured to direct cooling air from a vehicle cabin to the ports.

11. A battery module for a vehicle comprising:
front and rear battery cell arrays arranged generally parallel to and spaced apart from one another;
a battery cover having first and second inlet ports proximate to the front battery cell array and arranged obliquely thereto;
a converter cover having a module inlet port proximate to a converter module housed therein;
a blower unit configured to draw air through the first and second inlet ports and the module inlet port, a first portion of the air traveling into the front battery cell array;
a pair of ducts to direct air to the ports, one of the ducts in fluid communication with the module inlet port and one of the first and second inlet ports; and
a tray cooperating with the front battery cell array to define a passageway configured to direct a second portion of the air underneath the front battery cell array, the tray further defining a ramp underneath, and extending substantially a length of, the rear battery cell array and configured to direct the second portion into the rear battery cell array.

12. The battery module of claim 11, wherein a spacing between the front and rear battery cell arrays defines another passageway configured to direct the first portion of air exiting the front battery cell array, and the second portion of air into the rear battery cell array.

13. The battery module of claim 11, wherein the front and rear battery array cells are spaced apart from one another such that heated air exiting a lateral side of the front battery cell array enters a lateral side of the rear battery cell array adjacent to the lateral side of the front battery cell array.

14. The battery module of claim 11, wherein the ducts are configured to direct cooling air from a vehicle cabin into the inlet ports.

* * * * *